United States Patent
Koster et al.

(10) Patent No.: US 9,210,262 B1
(45) Date of Patent: Dec. 8, 2015

(54) USING A SPEECH ANALYTICS SYSTEM TO CONTROL PRE-RECORDED SCRIPTS FOR DEBT COLLECTION CALLS

(71) Applicant: Noble Systems Corporation, Atlanta, GA (US)

(72) Inventors: Karl H. Koster, Sandy Springs, GA (US); Edward G. Hodges, Jr., Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 14/192,091

(22) Filed: Feb. 27, 2014

Related U.S. Application Data

(63) Continuation-in-part of application No. 13/949,764, filed on Jul. 24, 2013, now Pat. No. 8,693,644.

(51) Int. Cl.
- *H04M 1/64* (2006.01)
- *H04M 3/493* (2006.01)
- *H04M 3/51* (2006.01)

(52) U.S. Cl.
CPC .......... *H04M 3/4936* (2013.01); *H04M 3/5133* (2013.01)

(58) Field of Classification Search
CPC .......................... H04M 3/4936; H04M 3/5133
USPC .............................. 379/88.01, 265.06, 265.13
See application file for complete search history.

(56) References Cited

U.S. PATENT DOCUMENTS

| | | | |
|---|---|---|---|
| 6,721,416 B1 * | 4/2004 | Farrell | 379/265.07 |
| 7,133,828 B2 | 11/2006 | Scarano et al. | |
| 7,542,902 B2 | 6/2009 | Scahill et al. | |
| 7,752,043 B2 | 7/2010 | Watson | |
| 8,027,458 B1 * | 9/2011 | Pollock | 379/265.12 |
| 8,130,937 B1 * | 3/2012 | Thenthiruperai et al. | 379/266.02 |
| 8,175,007 B2 | 5/2012 | Jain et al. | |
| 8,209,182 B2 | 6/2012 | Narayanan | |
| 2003/0002651 A1 | 1/2003 | Shires | |
| 2004/0008828 A1 | 1/2004 | Coles et al. | |
| 2005/0216269 A1 * | 9/2005 | Scahill et al. | 704/270.1 |
| 2010/0138411 A1 | 6/2010 | Judy et al. | |
| 2011/0033036 A1 * | 2/2011 | Edwards et al. | 379/265.09 |
| 2011/0125499 A1 | 5/2011 | Griggs et al. | |
| 2011/0307258 A1 | 12/2011 | Liberman et al. | |

OTHER PUBLICATIONS

Three Steps for Attacking Adherence Problems, Reynolds, Penny, Contact Center Association, Jan. 24, 2012.

* cited by examiner

*Primary Examiner* — Fan Tsang
*Assistant Examiner* — Van D Huynh

(57) ABSTRACT

A speech analytics system ("SAS") monitors speech from a remote party and agent to determine when text-based guidance information ("TBGI") and a script control icon is to be provided to the agent. The agent may respond to a particular context with certain information, either by verbally informing the remote party or causing a prerecorded script to be played to the remote party. In one embodiment, the SAS monitors the agent's speech to ascertain if an expected speech response is provided by the agent within a first time period. If not, the SAS may cause another TBGI and script control icon to be presented to the agent, and again monitor the agent's speech to ascertain if an expected speech response is provided by the agent within a second time period. If the agent again fails to respond properly, then data may be written indicating a compliance failure.

7 Claims, 11 Drawing Sheets

USING A SPEECH ANALYTICS SYSTEM TO CONTROL PRE-RECORDED SCRIPTS FOR DEBT COLLECTION CALLS

CROSS REFERENCE TO RELATED PATENT APPLICATIONS

This application is a continuation-in-part of U.S. patent application Ser. No. 13/949,764, filed on Jul. 24, 2013, entitled "Management System for Using Speech Analytics to Enhance Agent Compliance for Debt Collection Calls," the contents of which are incorporated by reference for all that they teach.

BACKGROUND

Agents in contact centers frequently handle calls addressing a range of topics, and frequently, the information provided follows a limited set of outcomes. For example, the agent may be required to inform the remote party of certain limitations associated with a purchase or a return policy of a purchased item. In many instances, the agent may recite the policy from a script, which may be presented on the agent's screen, or from memory. In other instances, the particular question or context may occur relatively infrequently, so that the agent may not readily recall the exact details of the policy. In other instances, agents may have different experience levels. A novice agent may not have the same experience base as a veteran agent to answer a question, and greater assistance may be required to be provided to the novice agent. In some instances, previously made recordings of informational announcements may be available for the agent to play to the remote party, but the agent may not be aware of which recordings are available, when they should be played, or may simply forget about the availability of an applicable recording.

In other instances, agents that fail to properly conform to a contact center policy, such as informing the remote party of a particular procedure, may cause the contact center to incur a fine or other form of financial liability for violating state or federal regulations. For example, calls that are made for the purpose of collecting debts are covered by various federal regulations as to how the call can be conducted and may require that certain information must be conveyed to the remote party. Such information can be conveyed by playing the remote party certain pre-recorded announcements. In other contexts, it may be appropriate for the agent to inquire of certain information from the remote party.

In some cases, an agent's failure to convey the appropriate information whether verbally or by playing a recorded announcement may be due to a lack of training or experience. In other instances, the agent may have sufficient training and/or experience, but may simply overlook or forget to do so. Detection of such deficiencies is conventionally detected by recording calls of the agent and then subsequently reviewing the call recordings to evaluate if the agent complied with the requirements. However, this approach results in detecting an agent's failure after it has occurred, and may not negate liability accruing to the contact center due to the failure of the agent. Furthermore, such approaches typically only review a sampling of calls from the agent, so that there may be a large number of other such calls before the error is noticed.

Thus, there is a need to provide context specific aids to an agent, so that the agent may provide the appropriate information to a remote party and/or otherwise conform with regulations for certain types of calls. These and other aspects are the focus of the concepts and technologies disclosed herein.

BRIEF SUMMARY

In general, various embodiments disclosed herein involve the use of a speech analytics system to control the provision of pre-recorded announcements by an agent in a contact center to a remote party on a call to ensure that specific information is provided to the remote party as appropriate for a particular context. Further, in some embodiments, the agent's conformance with certain policies related to debt-collection calls are monitored to ensure certain information is inquired from the remote party in certain contexts. In certain embodiments, the speech analytics system monitors the audio of the call in order to inform the agent that certain information is to be provided or obtained by the agent with respect to the remote party, either by the agent verbally indicating such or by facilitating the agent having a pre-recorded announcement or script played to the remote party.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
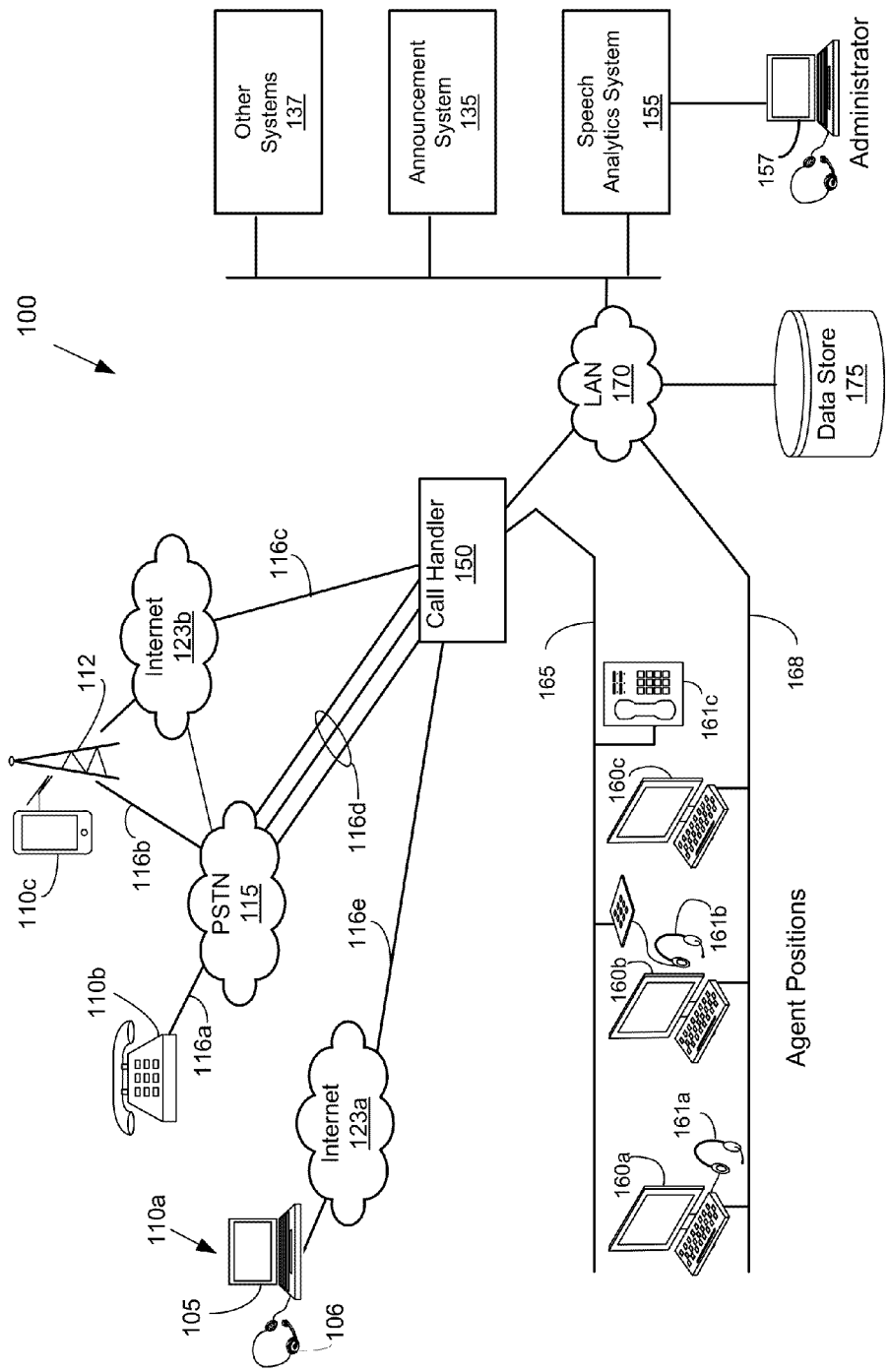
FIG. 1 illustrates an architecture of one embodiment of a contact center wherein a speech analytics system is used to facilitate an agent providing information to a remote party that is relevant to a context of a call involving the agent and the remote party.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

In various contexts, agents in a contact center may be required or expected to provide or inquire of certain information to/from a remote party on a call. This may be information that is required to be provided based on various contact center policies or various state and federal policies. Further, in various contexts, the agent may be required or expected to respond to information provided by the remote party in a certain way.

For example, in various circumstances an agent may be required to indicate to the remote party certain limitations or rights in the context of a call. This could range from providing the remote party with warranty information associated with a purchase to stating certain debtor rights when the call is for purposes of collecting a debt. The agent may be expected to provide certain information verbally to the remote party, and if the agent fails to do so, various reminders or tools to facilitate providing such information are made available to the agent.

In one embodiment, a text-based reminder, prompt, or other visually based information may be displayed on the agent's computer terminal according to the context of the call. These various forms of the text-based information are referred to herein as text-based guidance information ("TBGI"). A speech analytics system may monitor the audio during the call between the remote party and the agent to determine the appropriate content for providing the TBGI to the agent for a particular context. The information may summarize or remind the agent of certain points which the agent should indicate to, or inquire of, the remote party. In other embodiments, the TBGI information may be in a script format that the agent can read or paraphrase to the remote party.

In other embodiments, the agent is provided with an icon that represents a function that the agent can invoke. This is referred to as a "script control icon" and the function is referred to the "script control function." In one embodiment, the agent can invoke the script control function by selecting the script control icon. When the script control function is invoked, a pre-recorded announcement, referred to herein as a "script", is played or caused to be played to the remote party. This script may be recorded in the agent's voice or using another individual's voice. Allowing the agent to play a script relieves the agent from repetitiously stating the same set of information for each caller. In some embodiments when the script is recorded in the agent's own voice, this may minimize the likelihood of the remote party detecting that they are listening to a pre-recorded announcement.

The speech analytics system monitors the context of the call to ascertain when the TBGI and/or scrip control icon should be provided to the caller. The context refers to a certain situation or circumstance during a call, which is determined based on the content of the speech from the agent and/or remote party. Further, different contexts can be given a name to distinguish them. For example, a "warranty context" could be defined as when a customer asks the agent about the warranty of a product. A given context can be detected based on defining which keywords are spoken by the agent and/or remote party on the call.

The speech analytics system may ascertain the information that the agent should provide for a particular context. The speech analytics system may verify that the agent did provide the information to the remote party (either by verbally informing the remote party or causing a script to be played). In one embodiment, if the agent does not provide the information (e.g., either verbally or by having the script played), then a second TBGI reminder and/or warning can be provided to the agent, possibly with the script control icon. If the agent does not provide the required information at that point, then the agent may be deemed to be non-compliant with the particular policy, and information may be recorded reflecting this. Such information may be useful for evaluating the agent and/or measuring contact center policy adherence. Similarly, information regarding an agent conforming to the policy may be recorded as well.

A particular contact center policy can be illustrated in the context of debt collection calls. Debt collection calls may be subject to certain regulations that prohibit the agent from attempting to collect the debt if the remote party informs the agent that they have filed for bankruptcy. In such instances, the agent should cease their attempts in collecting the debt, and may instead inquire of the remote party's law firm or attorney handling the bankruptcy, or inquire of the bankruptcy case number. Failure to do this can lead to fines and/or sanctions against the contact center, and hence it is desirable to detect such contexts and correct any non-conforming behavior prior to it occurring, as opposed to detecting this after-the-fact when reviewing call recordings. Consequently, it may be very important to the contact center to detect the context of a called party declaring they have filed for bankruptcy and ensure the agent ceases further attempts to collect the debt, and instead obtains the name of the party's attorney and/or bankruptcy court case number.

Although the use of the concepts and technologies herein may be illustrated in the context of a debt collection call, the concepts and technologies may applied to other types of calls and contexts. Further, the principles disclosed herein can equally apply to calls received by the contact center or which are originated by the contact center. The illustrations provided herein may combine various capabilities to illustrate the flexibility of the application of the concepts and technologies, but simpler or even more complex configurations are possible, as will be evident.

Contact Center Architecture (FIG. 1)

Turning to FIG. 1, a high level architecture 100 of one embodiment is shown of the relevant components involved in a contact center. The architecture 100 shows a remote party represented by a conventional telephone 110b, although any number of different devices and technologies may be used by the remote party. For example, a remote party may use a workstation 110a comprising a computer 105 and a headset 106 connected to the Internet 123a. Or, the remote party may use a mobile phone 110c connected via a cellular mobile network 112, which in turn may use facilities 116b to a public switched telephone network ("PSTN") 115 or to the Internet 123b. The remote party may use a conventional phone that uses an analog telephone facility 116a via the PTSN 115, which in turn uses facilities 116d. Other networks and communications technologies may be employed, such as Voice over IP ("VoIP") technologies 116c, cable networks, mobile networks, session initiated protocols ("SIP"), etc.

The remote party may receive a call that originated from a call handler 150 (or is routed to the call handler) and that is routed by the communication network, such as the Internet 123a, 123b or the PSTN 115. The call handler 150 may be one of any number of various devices used for processing calls in a contact center, including but not limited to: dialers, predictive dialers, automatic call distributors ("ACDs"), interactive voice response units ("IVRs"), private branch exchanges ("PBXs"), etc.

The call handler may connect a portion of the call, i.e., a call leg on any of the facilities 116e, 116d, or 116c between the remote party and an agent. The agent may utilize a computer 160a-c, which may be part of a workstation used by the agent and the workstation may also include a voice device (i.e., phone), such as a headset 161b, telephone 161c, or a so-called soft-phone 161a integrated into the computer 160a. A local area network ("LAN") 170 may be used to transfer voice and/or non-voice data to the agent's workstation and communicate with other components using one or more links 168, channels, circuits, or other such communication constructs to the agent's computer (if so, then facility 165 may not be present). In other embodiments, separate facilities may be used for transferring computer data to the agent's computer and for transferring voice data to the agent's phone, such as using facilities 165. The exact technology and configuration of the agent's workstation and communication facilities at this point is not relevant, as long as there is a voice connection between the agent and the remote party. There may be a number of other configurations or technologies involved with respect to connecting the remote party and the agent, but this does not alter the principles of the concepts disclosed herein.

The contact center may also incorporate various components, including a speech analytics system ("SAS") 155 that may monitor and analyze speech during a call. This may be configured by an administrator using an administrative workstation 157. Although the SAS 155 may be referred to as a system, it may also be considered as a collection of components, which operate together as part of the overall architecture. The SAS may receive voice data using the LAN 170, or via other configurations. The contact center may also incorporate an announcement system 135, which can be used to store the scripts. These may be played by sending the digital recorded audio data over the LAN 170 to the call handler, which in turn provides the script to the called party. Other arrangements are possible, such as storing the scripts in a data store 175 which are retrieved when needed. Finally, other systems 137 may be present. These could be, for example, a text-to-speech system, and integrated voice response system ("IVR") or other such components.

Figure 2A:
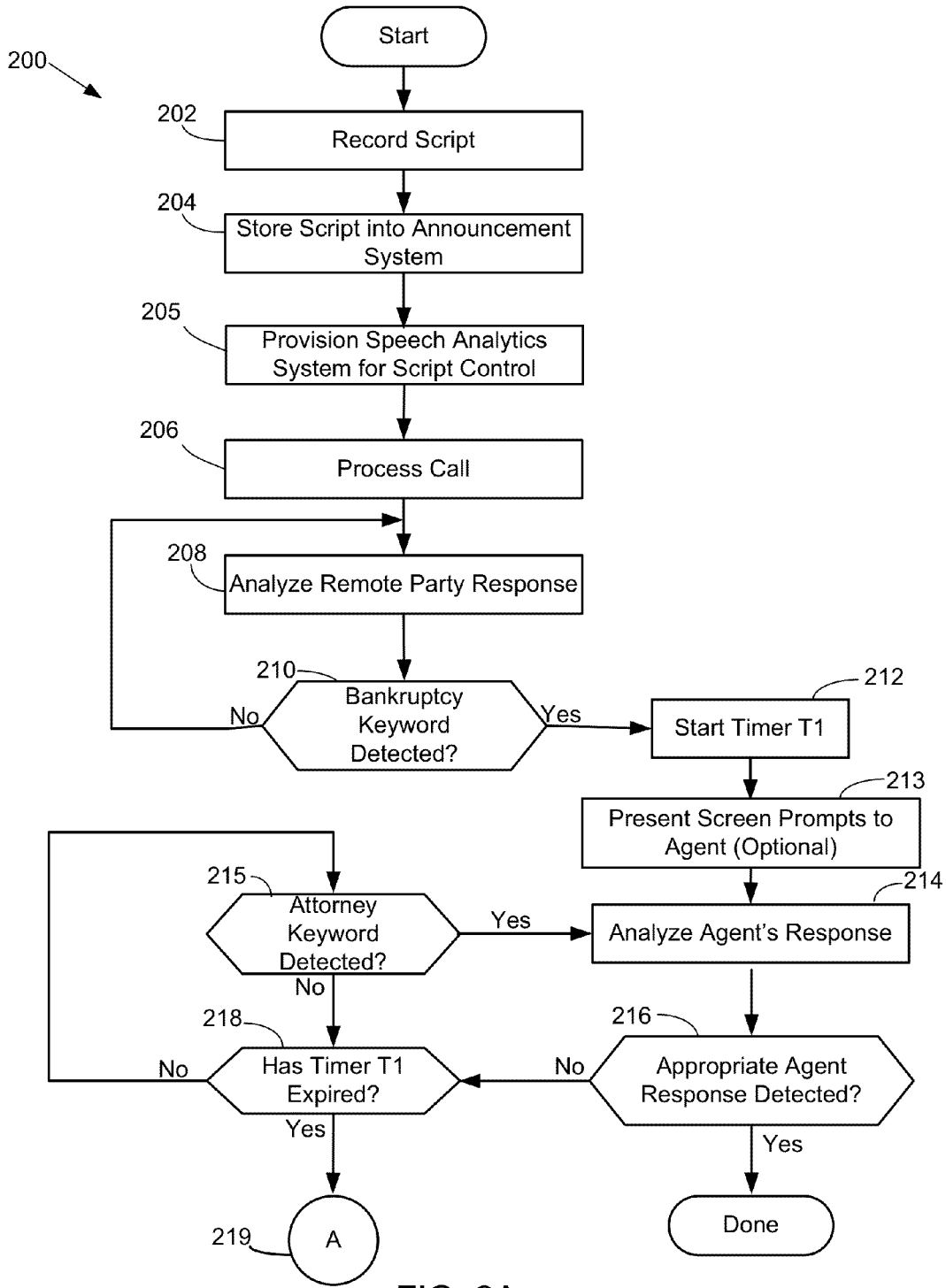
FIGS. 2A-2B illustrate a generic process flow for one embodiment to facilitate the agent providing information to the remote party in conjunction with the concepts and technologies disclosed herein.
Figure 2B:
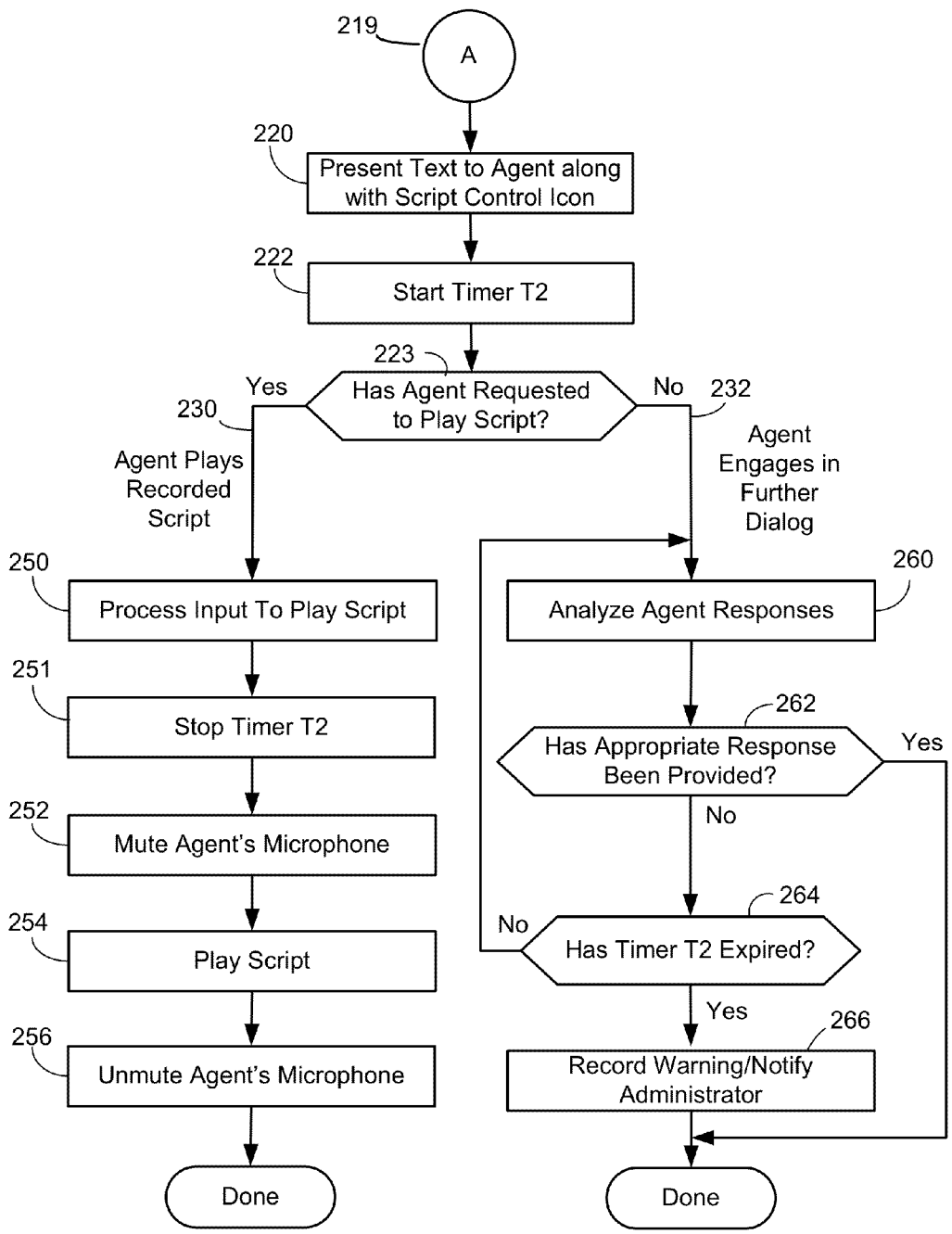

Service Overview (FIGS. 2A-2B)

As evident, there are a variety of contexts and applications in which an agent may be required to provide certain information to a remote party, which may be accomplished by the agent causing a pre-recorded script to be played to the remote party. Such opportunities may be indicated to the agent by causing an icon to appear on the agent's computer display, potentially with the TBGI indicating the appropriate response to be provided. The TBGI could function as a reminder to the agent to provide certain information, a command to the agent to provide such information, or a warning to the agent. How the TBGI is categorized may depend on the contents of the text. Further, depending on the context, the information to be provided may be suggested to the agent or it may be imperative that the agent provide the information.

To facilitate the agent providing the information, the agent may invoke a script control function causing the script to be played. For example, when a remote party asks a question pertaining to a particular subject, a script control icon could appear on the agent's screen along with a text-box that indicates information associated with the answer. The agent could select the script control icon to play the script, read the text in the text box verbatim, or recite an answer using information from the text box.

In the example that follows, certain capabilities will be illustrated using an example of an agent involved in a debt collection call, which allows certain combinations of capabilities to be illustrated. However, it should be evident that the capabilities illustrated can be used in other applications and by using other configurations of capabilities.

A high level process flow 200 for accomplishing this is shown in FIG. 2A, which begins with recording a script in operation 202. This can be recorded in the agent's own voice, or another individual's voice. There may be a variety of scripts recorded for different purposes, and each script may be labeled or identified by a different phrase or name. Typically, each script is defined for use in a particular context. In some instances, there may be multiple scripts for a particular context. For example, in the aforementioned warranty context, there may be one script recorded for handling warranty claims within a 30 day warranty period and another script for handling claims outside the 30 day warranty period.

The script may be then stored in an announcement system in operation 204. In various embodiments, the script may be stored and played by an IVR, call handler, or a dedicated announcement system. In other embodiments, the script may be stored in a file store, such as a database, and played by one of the above components. In various embodiments, the script may be stored and recorded as analog recordings or digital audio files. For purposes of illustration, a separate announcement system 135 is presumed to be used.

Next, a SAS 155 is provisioned in operation 205 to detect the context, which is accomplished by detecting the appropriate keywords from the appropriate party. The SAS causes the appropriate icons to be displayed on the agent's desktop thus allowing the agent to cause the appropriate script to be played. In other embodiments, the SAS may be configured to automatically cause the script to be played without requiring any input from the agent. This arrangement may be used if there is only one suitable script to be played for that context. Further, the SAS may be configured to also provide the corresponding TBGI via a pop-up display window that provides information to the agent about an appropriate response or an appropriate announcement to play.

Once all the components are provisioned properly, a call may be processed in operation 206. This may be an incoming or outgoing call, and/or limited to certain campaigns or agents. In this embodiment for a debt collection call, speech from the remote party is analyzed first by the SAS in operation 208. In a debt collection call, the analysis of the audio involves first detecting whether the remote party has formally declared bankruptcy. The process determines in operation 210 whether the context is detected by detecting a keyword spoken by the remote party. If not, then the process loops back to operation 208 and continues to analyze the remote party's speech. If no such keyword is detected at all, then at some point the call will be terminated, which will interrupt the process flow (the call termination is not shown in FIG. 2A).

The keyword detected may vary according to the particular context to be detected. The keyword may be a word, phrase, or a logical arrangement of various words. In the example of a debt collection call, a party responding to a debt collection effort may inform the agent they have filed bankruptcy would likely use at least one of the words such as: "bankrupt", "bankruptcy", "filed for bankruptcy", "chapter 7 bankruptcy", "lawyer", "law firm", or "bankruptcy court." A logical arrangement of various words may include, for example, detecting the words "filed" or "filing" used adjacent to the words of "bankruptcy" or "bankrupt." Furthermore, it is likely that the remote party would indicate this fairly early in the call. For example, a debtor may indicate to the agent upon learning the purpose of the call that: "I can't pay because I have filed for bankruptcy in court; my lawyer said you should talk to him." Thus, the SAS may be configured to determine this context within the first minute or two of the call, or after the agent informs the party of the purpose of the call.

The set of keywords identifying a particular context (e.g., the context itself) may be given a name. For purposes of reference, circumstance of the remote party having declared bankruptcy is referred to as the "bankruptcy context." Detecting the bankruptcy context may be accomplished by detecting if the remote party uttered a word from the "bankruptcy keyword set." Over time, the keywords defined for this context could be refined or modified based on experience, so that when a remote party conveys that they have filed for bankruptcy in different ways, it is likely that the bankruptcy context will be detected.

Returning to FIG. 2A, after a bankruptcy keyword is detected in operation 210 indicating detection of the bankruptcy context, timer T1 is started in operation 212. This timer is used to determine whether the agent has properly responded to the bankruptcy context. The agent, upon learning of the party's filing of bankruptcy, should cease collection efforts and instead inquire of the name of the lawyer or law firm handling the case.

As a result of detecting the bankruptcy context, an appropriate TBGI may be presented to the agent via the agent's computer in operation 213. This could be a simple reminder of how to proceed under the circumstances. For example, a display window may pop-up on the agent's screen providing instructions stating: "do not proceed with attempting to collect the debt if the individual has declared bankruptcy, but inquire of the party's lawyer or court case number." In other embodiments, the pop-up window may present the actual text that the agent should recite verbatim for this context. In some embodiments, providing the TBGI may be optional, and only a screen control icon may be presented to the agent.

In this example, it is presumed that the agent will respond properly in most instances. Thus, in operation 214 the speech heard by the remote party is analyzed by the SAS. In many cases this speech originates from the agent, but in other instances it could be speech from the announcement system. The response is then analyzed in operation 216 to determine if the agent provided an appropriate response. An appropriate response may be ascertained by detecting a particular keyword, which reflects a particular context. In this case, the keyword set or context is referred to as the "attorney keyword" set or "attorney context." This is because the agent should inquire of the remote party's lawyer, attorney, law firm, or court case number. Thus, possible keywords may include: "attorney", "law firm", "lawyer", "court case number", "telephone", or "name." One or more of these words would likely be used by the agent to inquire of the law firm or lawyer handling the remote party's bankruptcy. If the agent causes the script to be played or recites the TBGI verbatim, then the keyword detected can closely track the words used in the script or TBGI.

If the agent did not provide an appropriate response in operation 216, then a test is made to see whether the timer T1 has expired in operation 218. If not, then the process loops to determine if an attorney keyword is detected in operation 215. Essentially, these processes 218, 215, 214, and 216 are executed in a loop until an appropriate response is detected or the timer T1 has expired. If an appropriate response is detected in operation 216, then the process is completed. Essentially, this reflects that the agent has properly inquired of the remote party's lawyer that is handling their bankruptcy.

However, if an appropriate response is not provided by the agent and timer T1 has expired in operation 218, then the process continues to process identified by Label A 219, which is shown in greater detail in FIG. 2B. Turning to FIG. 2B, the agent is then provided with a second TBGI in a pop-up window along with the script control icon to play the script in operation 220. The agent may, for example, not be aware of the policy and may have forgotten the correct procedure. In this case, the TBGI may provide detailed information and the script control icon allows the agent to simply request the playing of the script if the agent desires to do so.

Next, a second timer, T2, is started in operation 222. This second timer is started to determine if the agent has taken the appropriate action in response to the second TBGI that was presented in operation 220. The agent may take one of two courses of action at this point. The agent may read or paraphrase the information in the TBGI or cause the prerecorded script to be played to the remote party. This test is performed in operation 223 by determining whether a command is received from the agent to play the script. If the command has been received as represented by path 230, then the input to play the script is processed in operation 250. The timer T2 is stopped in operation 251, since an appropriate response was provided by the agent. There is no need to monitor the audio, since the script is presumed to be properly scripted. The agent's microphone may be muted in operation 252, so as to avoid audio from the agent being merged onto the call with the script audio. Next, the script is played to the remote party in operation 254, and the agent's microphone is unmuted in operation 256 when the script is completed. At this point the process is completed.

Returning to operation 223, the agent may instead decide to engage in further dialogue with the remote party represented by path 232, rather than causing a script to be played. If so, the agent's responses are further analyzed in operation 260 and a determination is made whether the agent provided an appropriate response in operation 262. If not, then a test is made in operation 264 as to whether the timer T2 has expired. If not, the process loops back to operation 260 where the agent's responses are monitored and tested to see an appropriate response has been provided.

If an appropriate response is not provided at the expiry of T2 in operation 264, then data is recorded of the agent's failure in operation 266. It is possible to further include another TBGI warning to the agent to minimize future mistakes and/or notifying the agent's supervisor. If, however, an appropriate response has been provided in operation 262, then the process is completed.

The above illustration shows that certain contexts can be detected based on the speech from a particular party. To recap, an indication that the context was detected along with TBGI may be provided to the agent, which may include a script to be recited. In addition, the pop-up window may include the script control icon to play a particular script. Further, a timer may be started to determine if the agent has responded properly to the particular context within a desired time window. The agent may respond properly by providing certain information (or asking questions) to the remote party or causing an announcement to be played. It is evident that multiple icons for multiple scripts could be presented to the agent, so that the agent could select from among a plurality of scripts to be played. Further, in other embodiments, the script could be automatically played, that is, without the agent specifically commanding the script to be played.

Figure 3:
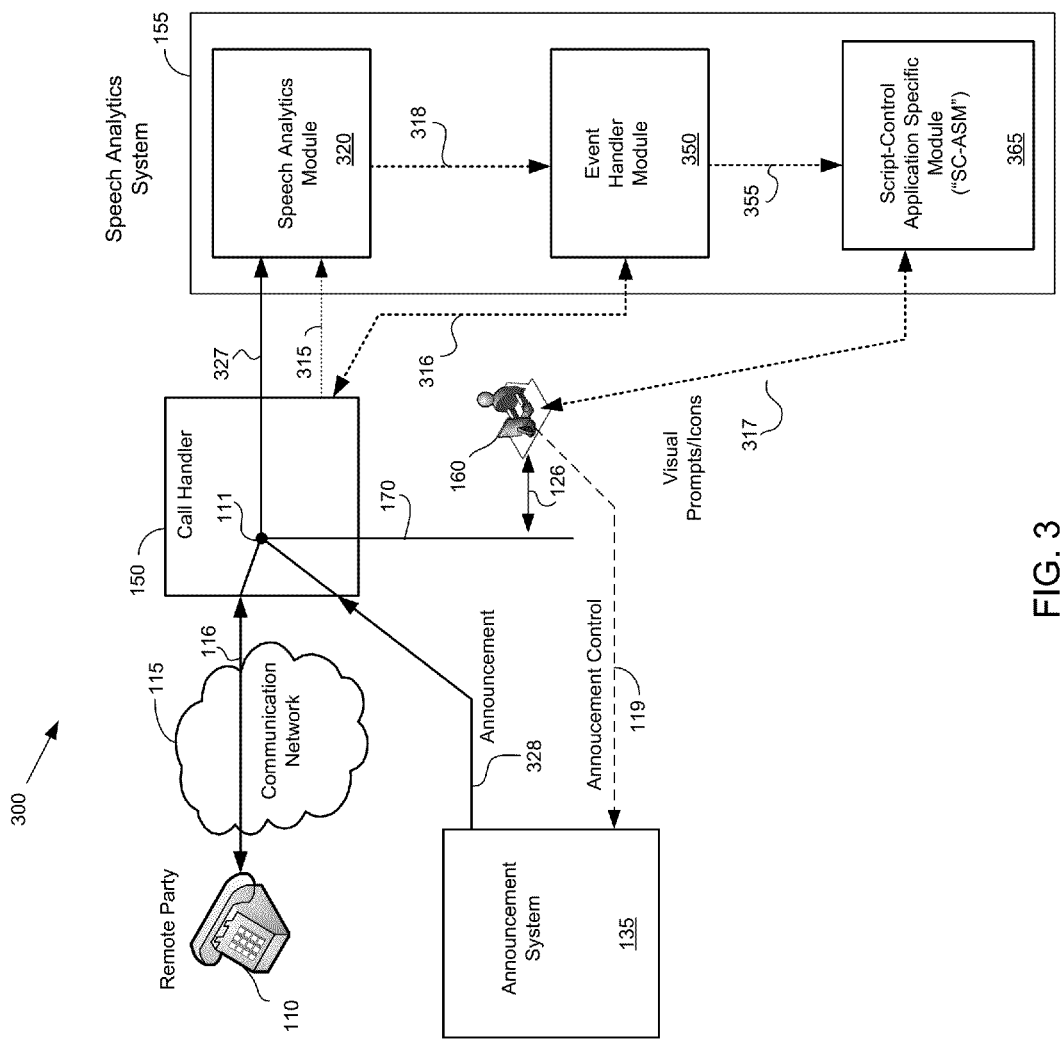
FIG. 3 illustrates a more focused view of one embodiment of the architecture involving the speech analytics system according to the concepts and technologies disclosed herein.

Speech Analytics System Architecture (FIG. 3)

In light of the above service example and associated capabilities for the agent to provide pre-recorded scripts, an architecture for implementing these capabilities is shown in FIG. 3. This architecture 300 is based on the architecture shown in FIG. 1, but provides additional details in some respects, and less detail in other respects.

A remote party represented by a conventional telephone 110 is shown communicating over a facility 116 via a communications network 115 with the call handler 150. The call handler 150 incorporates an audio bridge 111, which connects various call legs to other components so that audio from one call leg is provided to the other call legs.

The bridge in this embodiment involves a four port bridge, and comprises one call leg that goes to the remote party, a second call leg that goes to the agent, a third call leg that goes to the SAS 155, and potentially a fourth call leg that goes to the announcement system 135. As will be seen, the announcement system may be integrated into the SAS or could be a text-to-speech system, or a human. From the perspective of the two endpoints associated with a call leg in a conference call, the call leg may be largely indistinguishable from a conventional call. Thus, a call leg involving two entities may be referenced herein as a call or as a call leg.

One call leg involves the facility 116 to the remote party and another call leg to the agent may involve a communication path 126 conveyed via the LAN 170 (shown here in FIG. 3 as a single line, as opposed to a cloud in FIG. 1). Once the remote party is connected to the agent, the call handler 150 may automatically bridge on a speech analytics system ("SAS") 155 to the bridge 111 using a third call leg 327. This arrangement allows the SAS 155 to monitor an ongoing conversation between the remote party and the agent. Once a particular context has been determined, the SAS 155 may send a message over link 317 to the agent's computer display, which can cause a script control icon and/or TBGI to be displayed. The agent can then use their computer 160 to select the script control icon to cause the announcement to be played. In one embodiment, this is accomplished by sending a message sent over facility 119 to the announcement system 135 to play the script. In other embodiments, the agent may invoke the script control function by sending a message back to the SAS 155 on link 317, which in turn, directly communicates with the announcement system 135.

Returning to the SAS 155 shown in FIG. 3, the SAS comprises in one embodiment a speech analytics module ("SAM") 320, an event handler module ("EHM") 350, and a Script Control Application Specific Module ("SC-ASM") 365. These modules cooperate so as to monitor the speech present during a call, identify a defined context during the call, and cause the appropriate TBGI pop-up window and script control icon(s) to be provided to the agent's computer. More will be said below as to how these modules cooperate to accomplish this.

Each of these modules 320, 350, and 365 may be a set of computer instructions along with a separate hardware processing system that in turn comprises a processor. Or, these modules may be integrated and executing in a single common hardware processing system. Other variations are possible. In some embodiments, the EHM 350 and the SC-ASM 365 are integrated into one module, while other embodiments may integrate the SAM 320 with the EHM 350. It is also possible for some of the modules to be offered as a service by a service provider, or implemented in a premised-based solution by a contact center.

For example, in one embodiment, the call handler may be offered as a premise-based or a hosted service (e.g., in the "cloud"), and bridges on the SAS 155, which is also offered as a hosted service. The call handler and the SAS may be remotely located from each other and may be operated and controlled by different entities. In addition, all the agent computers may be co-located in a single physical location, which comprises the "premised based" call center portion. In other embodiments, the agent computers may be dispersed (e.g., work-at-home). Similarly, the announcement system 135 may be a hosted service, co-located with the other system components, or integrated with other components. In this figure, the announcement system 135 is accessed as a local component to the contact center using a link 119, which may be implemented using a LAN, such as the aforementioned LAN 170. To clarify the concepts, this description is based on describing various functions and their interaction with each other, and it should be recognized that these modules may be deployed in various configurations, using different physical components, processors, and at different locations.

For the SAS 155 to monitor the speech between the remote party and the agent during the call, the audio bridge 111 may be used. In this embodiment, the bridge 111 is shown as located inside the call handler 150. In other embodiments, a bridge server or peripheral component comprising the bridge that is external to the call handler can be used. A call leg to the bridge may be either a bi-directional or unidirectional voice path(s). For example, the call leg to the remote party and the agent are typically bi-directional, so that each can hear and provide audio to the call. On the other hand, the call leg 327 to the SAS is typically unidirectional, since it only needs to receive audio. Similarly, the call leg 328 to the announcement system is also typically unidirectional, as it only provides audio to the bridge, and does not need to hear audio from the bridge.

Use of the term "call leg" does not imply a particular form of technology. Nor does the use of that term imply any particular physical structure of the call leg. The call leg may represent a single or multiple virtual circuits, audio streams, links, connections, paths, channels, or some other construct representing audio communications. Further, the reference to a bridge does not imply use of any particular form of technology, e.g., an analog bridge, digital bridge, etc.

The call legs can be implemented in a number of ways, and again it is possible to use a number of different technologies. It is possible that one call leg along its portion may use one technology, and another technology for the remaining portion, both of which may be distinct from another call leg that may be using another technology. For example, the call leg to the remote party may be converted to an analog phone line with analog voice transmission to accommodate a conventional telephone, whereas the call leg to the SAS may be based on Voice over IP ("VoIP") technology.

For purposes of illustration, in certain embodiments, although a single call leg may be described as being established, the call leg may involve multiple virtual connections, voice channels, or audio streams. For example, the call leg from the call handler 150 to the SAM 320 may involve establishing multiple VoIP streams or virtual connections to the SAM. For simplicity, FIG. 3 shows a single line 327 associated between the SAM 320 the bridge 111, but the single line 327 can represent multiple VoIP streams associated with the call. Thus, there could be multiple VoIP streams received by the SAM in conjunction with the call leg 327 to allow the SAM to separately analyze speech from the remote party and the agent. In other embodiments, this could be accomplished by using a single VoIP stream that conveys audio to the SAM, but using multiple streams facilitates the SAM distinguishing audio from one source from the other. Further, the call leg 327 depicts an arrow in the direction going to the SAM, indicating it is a unidirectional path. There are embodiments, as will be seen, in which the announcement system may be integrated into the SAS, or the SAS incorporates a TTS system, such that audio is provided from the SAS (e.g., SAM) to the bridge and requires the use of a bi-directional path.

In many embodiments two separate VoIP streams are established to the SAM—one for the agent and one for the remote party. This is described further in U.S. patent application Ser. No. 14/073,083, the contents of which are incorporated by reference. It may be advantageous to utilize this same architecture, which is based on the use of dual voice streams, for the principles and concepts disclosed herein. If so, then one VoIP stream to the SAM (which can be referred to as VoIP Stream #1 for convenience) conveys audio from the remote party only, and the other VoIP Stream (referred to as VoIP Stream #2) conveys audio from the agent only.

A signaling link 315 between the call handler 150 and the SAM 320 provides the appropriate signaling information necessary to establish and terminate the VoIP streams on call leg 327 and indicate to the SAS the necessary information for establishing the call leg. However, in other embodiments, a signaling link 316 may also exist and may be used to convey such signaling information to the EHM instead of, or in addition to, the link 315 to the SAM. In FIG. 3, signaling or control data is generally shown as a dotted line and voice data is shown as a solid line. Furthermore, use of the word "link" does not imply any particular logical or physical communication structure, protocol, or format used.

As previously indicated, the SAS 155 comprises the SAM 320, EHM 350, and the SC-ASM 365, which cooperate together to identify the appropriate context for presenting script controls to the agent. In other embodiments, the modules in the SAS cooperate to control an integrated TTS module or announcement component.

A primary function of the SAM 320 is to analyze the speech of the call and provide specific event notifications to the EHM 350. Depending on the embodiment, the SAM can be configured to listen to the speech from either the remote party or the agent (or both). In one embodiment, two VoIP streams are used for the call leg to the SAM, so that the SAM can readily detect the remote party's speech from the agent's speech.

Thus, in various embodiments, the SAM is configured to identify speech from the agent or remote party that is correspondingly defined in the SC-ASM for a particular context. This determination depends on the particular application, and may be defined for specific purposes as determined by the contact center management when configuring the SAS. Further examples and discussion of this is provided below. In general, the process begins with the SAM detecting certain words or phrases ("keywords"), which cause the SAM 320 to generate event notifications. These event notifications are received by the EHM 350 using link 318.

There are two types of event notifications. The first type indicates information about the existence or termination of a call (e.g., a call leg to the SAM) and the second type indicates information about speech detected during the call. The former event notification messages are referred to as "call-related event notification messages" or simply "call-related event notifications" and these, as mentioned, indicate the establishment or termination of a call leg to the SAM. The latter event notification messages are referred to as "speech-related event notification messages" or simply "speech-related event notifications" and these indicate detection of a particular keyword in the speech of a particular call.

The speech-related event notifications originate from the SAM 320 and are transmitted to the EHM using link 318. For instance, returning to the example involving a debt collection call, the speech-related event notifications may identify the context or specific words (e.g., the bankruptcy keyword set) detected from the remote party. The SAM 320 reports such speech occurrences to the EHM 350. The EHM ensures that the correct ASM receives the appropriate event notifications, as there may be a variety of ASMs executing for various purposes. In addition, there may be multiple simultaneous calls handled by the same ASM. Further, for a given call there may be a number of different contexts that can be detected. For example, in debt collection calls there is a context associated with the remote party (the bankruptcy context) and a separate context associated with the agent (the attorney context).

The EHM also ensures that the proper contextual information is provided to the proper ASM, which for this application is the SC-ASM 365. This contextual information may include which call the speech-related event notification relates to (indicated by some form of call identifier), which party spoke the keyword (e.g., the agent or remote party), and which keyword or context was detected (indicating the word/phrase or a particular context).

In contrast to speech-related event notifications for which there can be zero or many for a given call, there are typically two call-related event notifications associated with a given call that are conveyed to the EHM. The first is an indication that the call leg has been established to the SAM and the second is that the call leg has been terminated to the SAM. Each call must have at least these two call-related event notifications generated at some point.

Because the speech-related event notifications are directly related to detecting keywords during a particular call, receiving a speech-related event notification requires that a corresponding call-related event notification indicating establishment of the call was previously generated. The speech-related event notification references the call through some sort of call identifier, and hence the identifier must have been previously generated.

In many contexts discussed herein, reference to an "event notification" for a call implicitly refers to a speech-related event notification for that call. Usually, the context in which the phrase is used will indicate whether the term "event notification" refers to both types or just refers to the speech-related type of event notifications. The procedures for handling call-related event notifications are relatively straightforward and are similar for various applications. However, there may be any number of speech-related event notifications and the processing of these is typically context and application dependent. In one embodiment, the EHM ensures that only the appropriate speech-related event notifications are sent to the SC-ASM.

The call handler 150 provides information via signaling link 315 to the SAM 320 regarding call legs established from the call handler to the SAM, as well as call legs that are terminated. In some embodiments, the SAM may provide the call-related event notification messages to the EHM using link 318. In other embodiments, the call handler may provide the call-related event notification messages to the EHM using link 316. In either embodiment, the EHM receives the call-related event notification messages, which it forwards to the SC-ASM. Thus, the SC-ASM is aware of the establishment and termination of calls between agents and remote parties and corresponding call legs involving the call handler and the SAM.

At a high level, the purpose of the EHM is to route the event notification messages to the appropriate ASMs. There may be a number of different types of ASMs defined, which may require receiving event notification messages. In one embodiment, the EHM is configured to route a copy of each call-related event notification message to each ASM. However, speech-related event notification messages may be sent to each ASM as well, or only to the appropriate ASMs as defined. For example, if there are multiple ASMs used for different purposes, then the EHM may ensure the proper ASMs receive the appropriate event notifications via link 355. An ASM that receives a speech-related event notification that does not pertain to a context associated with the ASM may simply disregard the speech-related event notification. Further information as to the reasoning and details of this operation can be found in the aforementioned patent applications incorporated by reference.

To recap, the EHM 350 receives event notifications, which may be either call-related or speech-related. The call-related event notifications may be received from the SAM on link 318 or from the call handler on link 316. The speech-related event notifications are typically received from the SAM 120 on link 318. The EHM informs the appropriate ASMs of the speech-related event notifications using link 355. The SC-ASM comprises the logic to identify a particular context and to take appropriate actions, such as indicate the appropriate TBGI or script control icons to the agent.

Figure 4A:
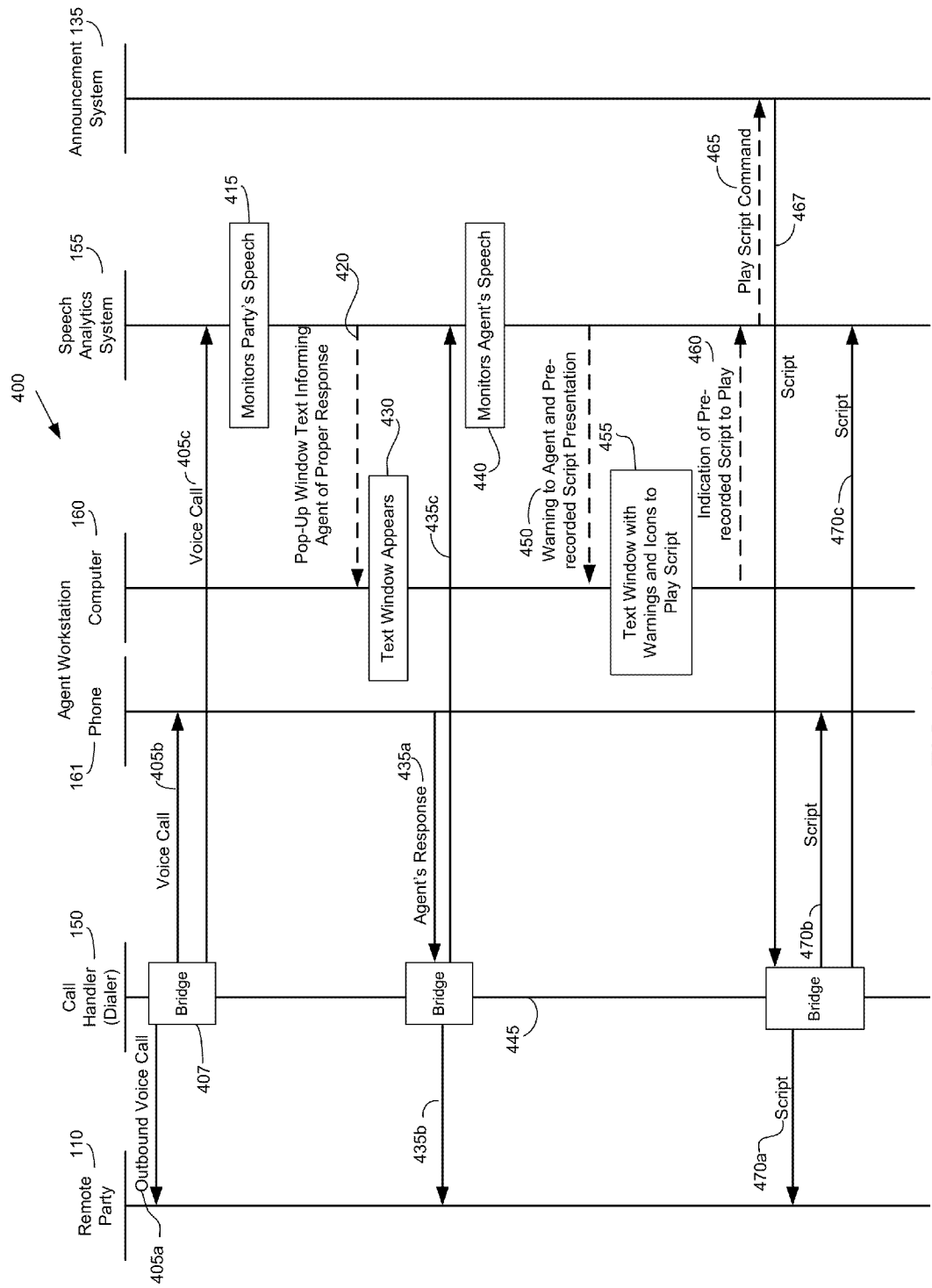
FIGS. 4A-4B illustrate message flows of two embodiments between various components in the architecture according to various embodiments disclosed herein.
Figure 4B:
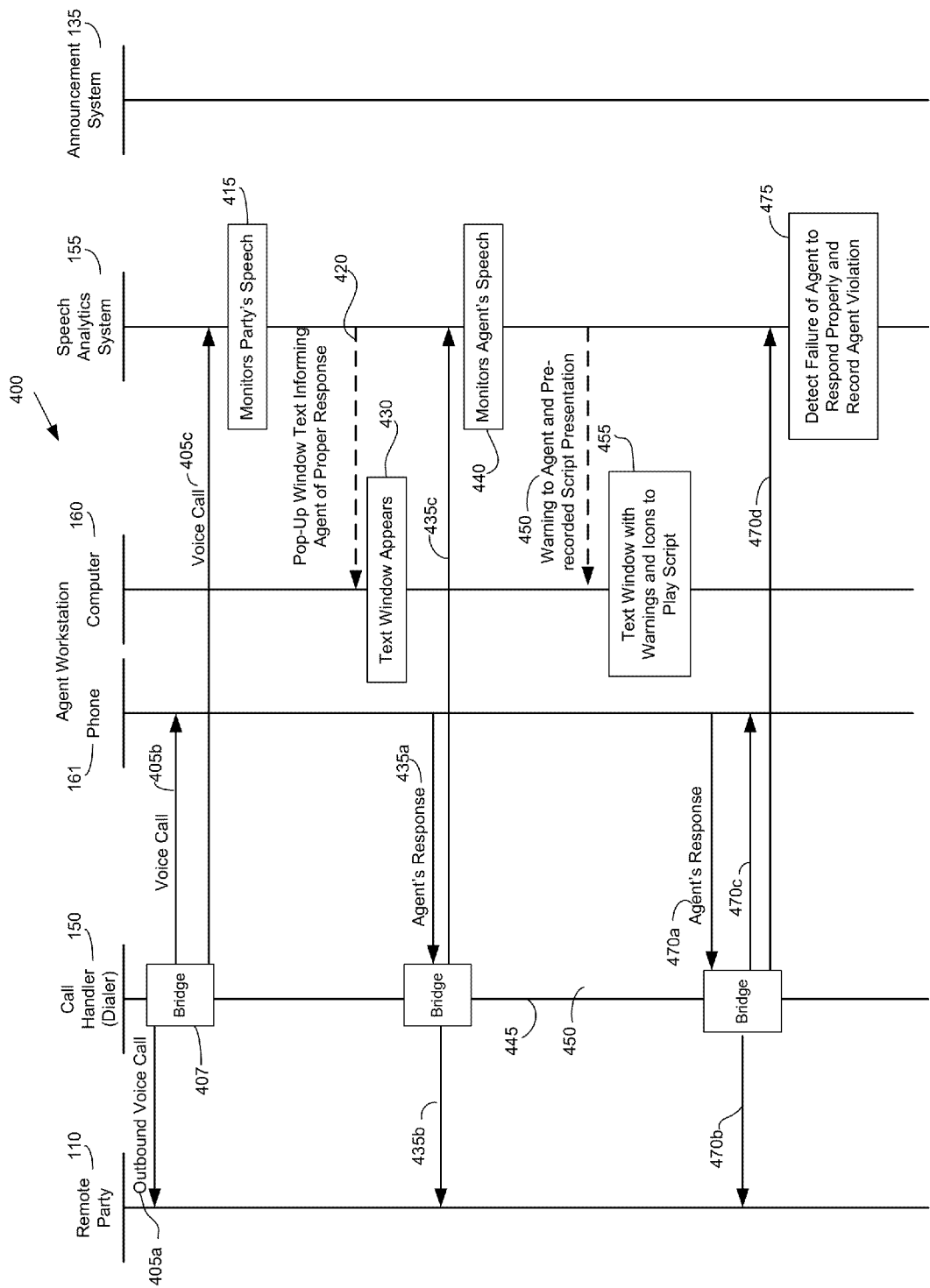

Message Flows (FIGS. 4A and 4B)

Turning to FIG. 4A, an exemplary message flow further illustrates the interaction of the components of the architecture shown in FIG. 3. This line diagram illustrate various messages that may be exchanged over time between the remote party 110, the call handler 150, the agent workstation comprising the phone 161 and computer 160, the SAS 155, and the announcement system 135.

First, the call handler establishes a plurality of call legs 405a, 405b, and 405c to the remote party, agent, and the SAS respectively, using a bridge 407. The sequence of the establishment of each call leg may vary. In various embodiments, a call leg may be established to the announcement system at this point in time, or later when it is determined a script needs to be played.

At this time, the agent and remote party begin to converse, and the SAS monitors the speech in operation 415 to identify a particular context. For instance, in the debt collection call example, the SAS is monitoring the audio to detect if the remote party utters words associated with the bankrupt keyword set. Assuming the bankruptcy context is detected, the SAS then sends a signaling message 420 to the agent's computer with the TBGI informing the agent of the need to cease debt collection efforts and inquire of the law firm representing the remote party. This information is manifested as a text window appearing on the agent's computer in operation 430. The SAS then monitors for the attorney context based on the agent's speech.

Presumably, the agent responds by verbally continuing a dialogue with the remote party as shown in response 435a. The agent's speech is provided via the bridge to the call legs 435b, 435c, to the remote party and the SAS. The SAS in operation 440 monitors the agent's speech to determine if an appropriate response is provided. Namely, the agent's speech is monitored to determine if the appropriate keywords from the attorney keyword set are detected.

If an appropriate response is not detected in the agent's speech within a certain time period, then the SAS may send a warning message 450 to the agent computer via another TBGI, resulting in a text window and a script control icon displayed in operation 455. In this embodiment, it is presumed that the agent selects a script control icon to play the corresponding script in message 460. A message is sent from the agent's computer to the SAS, and the SAS responds by commanding the announcement system to play the script in message 465. In other embodiments, the invocation of the script control icon could result in a message sent from the agent's computer to the announcement system directly.

In either case, the announcement system is bridged to the call (if this has not already occurred) and plays the pre-recorded script 467 to the bridge, which is provided over call legs 470a, 470b, and 470c to the remote party, agent, and SAS respectively. In some embodiments, the SAS may confirm the appropriate response has been provided to the remote party. For example, if the command to play the announcement is provided by the agent's computer directly to the announcement system, then the SAS may confirm the appropriate response by monitoring the audio. In other embodiments, such as when the script control icon request is processed by the SAS, then the SAS knows that a proper response is provided by virtue by causing the script to be played.

As noted before, the announcement system could be bridged on at the beginning of the call, or the SAS could request the call handler to bridge on the announcement system when the SAS determines that the script should be played. This event may occur at different times, and using various signaling methods.

In FIG. 4A, the agent responded to the text window and script control icon in operation 455 by invoking the script control icon 460. FIG. 4B depicts another course of action that could be taken by the agent. FIG. 4B depicts the same messages and operations up to operation 455, which presents the TBGI and script control icon to the agent. At this point, the agent may decide instead to verbally indicate (or request) the appropriate information to the remote party. In this case the agent's response 470a is provided to the bridge and then via call legs 470b, 470d to the remote party and SAS respectively. The SAS may monitor the agent's response using call leg 470c to determine whether the agent responded properly in operation 475 (e.g., was the attorney context detected). If the agent did not respond properly, then appropriate information could be written to memory using a data structure generated and maintained by the ASM (which as will be discussed, is called a "call instance"). This information can be used to evaluate, review, or coach the agent. It is also possible to write information in the call instance data structure when the agent correctly responds, as well.

Speech Analytics System Process Flows (FIGS. 5-8)

The process flows for the SAS involves process flows for the three components, the SAM, the EHM, and the ASM. In other instances, the SAS may be, itself, referred to as a component in a larger system. As noted earlier, these components cooperate to identify the appropriate context in a call, and in response, provide the appropriate script control icon and/or TBGI to the agent's desktop.

SAM Process Flows

Figure 5:
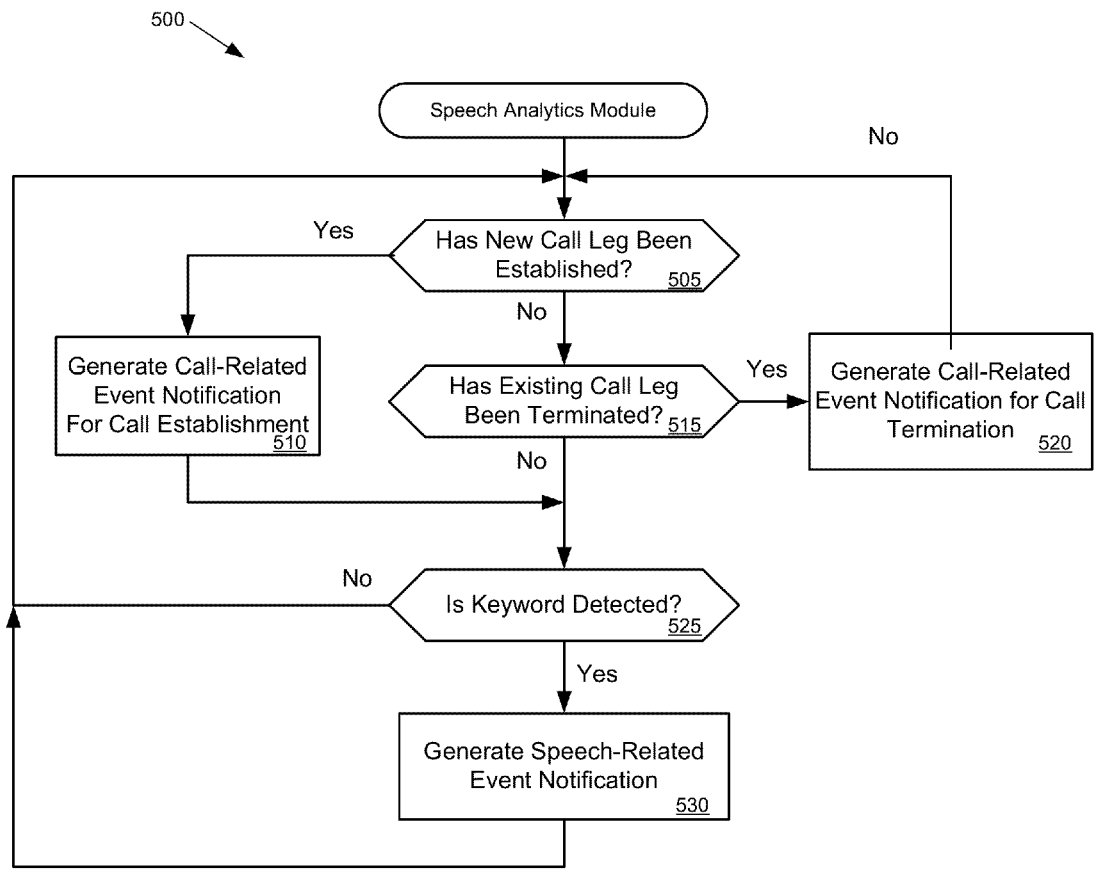
FIG. 5 illustrates a process flow for an embodiment of the speech analytics module in the speech analytics system according to the concepts and technologies disclosed herein.

Turning to the SAM first, a process flow shown in FIG. 5 illustrates one embodiment of the basic flow. Recall that the SAM has call legs established between it and the bridge so that it can monitor the audio from one or more parties on the call. The SAM also then reports detection of certain keywords or contexts, along with associated information, which is passed to the EHM.

Turning to FIG. 5, the process flow 500 begins with determining whether a new call leg to the SAM has been established in operation 505. If this has occurred, then a call-related event notification is generated in operation 510 indicating establishment of a call leg. If a new call leg has not been generated in operation 505, then a test determines whether an existing call leg has been terminated in operation 515. If so, then a call-related event notification is generated in operation 520 indicating the call leg was terminated.

Assuming, e.g., that a call is established and active, it is possible that a keyword may be detected on the call leg in operation 525. If not, the process loops back to operation 505 where changes in call legs or keywords are detected. If a keyword is detected in operation 525, then the SAM generates a corresponding speech-related event notification in operation 530. This may include the appropriate corresponding information of what call leg was involved, which party spoke the keyword, the keyword or context, time of detection, etc.

These event notifications are generated from the SAM and provided to the EHM. Thus, the SAM continually monitors and informs the EHM of new calls, terminated calls, and detected keywords during the calls. In other embodiments, the SAM only informs the EHM of speech-related event notifications, as the EHM may receive the call-related event notifications directly from the call handler.

EHM Process Flows

Figure 6:
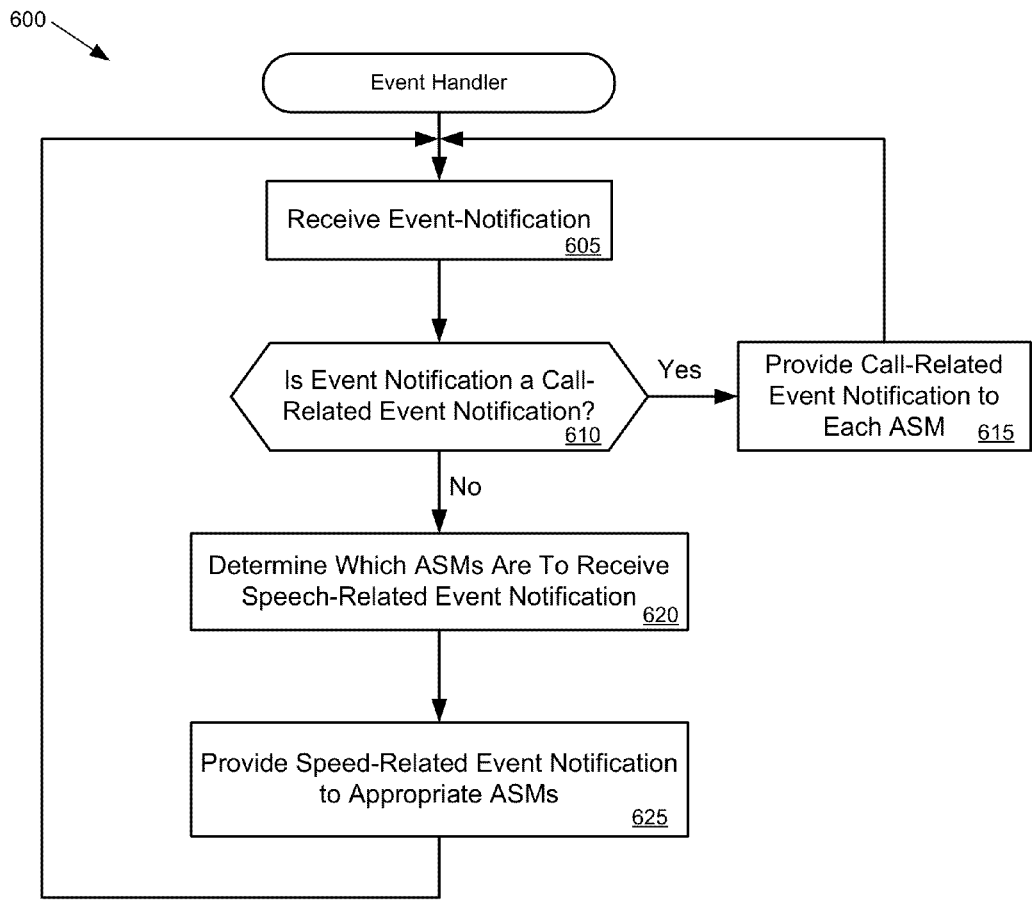
FIG. 6 illustrates a process flow for an embodiment of the event handler module in the speech analytics system according to the concepts and technologies disclosed herein.

The EHM receives the event notifications from the SAM, and distributes and/or routes the event notifications to the appropriate ASM(s). In some embodiments, the EHM may receive call-related event notifications from the call handler instead of the SAM. This process flow is illustrated in FIG. 6. The process flow 600 begins with receiving an event notification in operation 605. A test determines whether the event notification is a call-related event notification in operation 610. If so, then a copy of the event notification is provided to each ASM in operation 615. Basically, each ASM is informed of the generation of a call leg and the termination of a call leg. The process loops back to operation 605 where the next event notification is received.

If the event notification is not a call-related event notification as determined in operation 610, then the event notification must be a speech-related event notification. Thus, the process then continues to determine which ASM(s) should receive the speech-related event notification in operation 620. This may require the EHM to determine the particular keyword set (e.g., context) that is being reported, and determine which ASMs are to receive the event notification.

For example, it is possible that only a single ASM (the SC-ASM) is defined to receive notifications of the bankruptcy keyword set. Thus, if the speech-related event notification is reporting detection of a bankruptcy keyword (i.e., reporting detection of the bankruptcy context), then the EHM will forward the speech-related event notification to the SC-ASM. Otherwise, the EHM may route other speech-related event notifications to other ASMs. In other embodiments, there may be multiple ASMs which are to receive the speech-related event notifications. If so, then the EHM may send a copy to each ASM. In other embodiments, the EHM may simply forward each speech-related event notification to each ASM, and presume that there is logic in the ASM to determine whether the particular speech-related event notification is relevant or should be discarded.

Once the EHM determines which ASMs are to receive the speech-related event notification in operation 620, the EHM forwards a copy to the appropriate ASM(s) in operation 625. The process then loops back to operation 605 where the event handler is ready to process the next event notification.

ASM Process Flows

The process flows for the ASMs can be described in terms of how the event notifications are processed to realize the intended service. For the SC-ASM, the service is presumed to be providing the script control feature previously discussed, though it is realized that there are many variations of how the detailed procedures can be defined.

Figure 7:
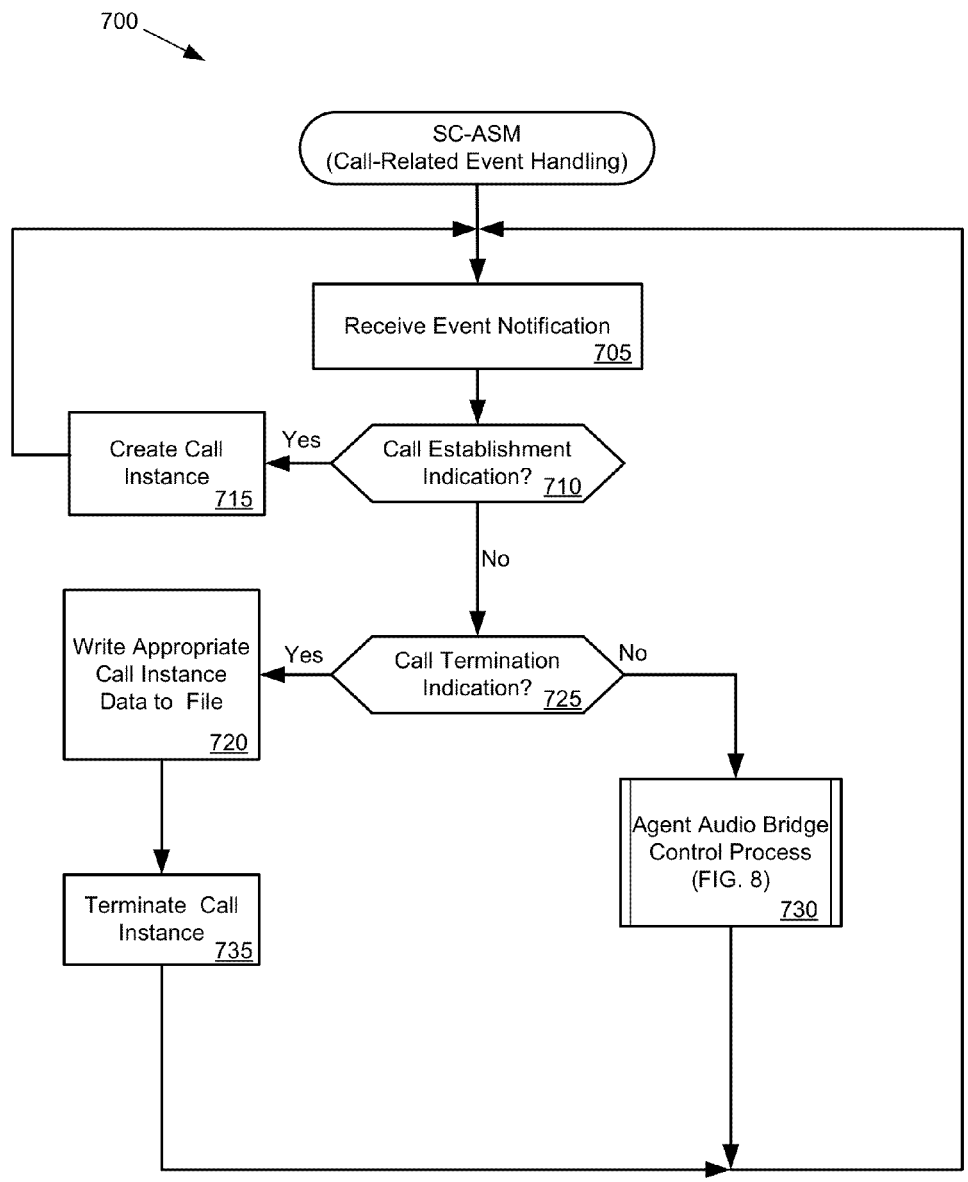
FIGS. 7-8 illustrate a process flow for an embodiment of the application specific module in the speech analytics system for facilitating the agent controlling scripts according to the concepts and technologies disclosed herein.

The logic defined in the SC-ASM operates on each call independently. The processing in the SC-ASM involves processing both call-related event notifications and speech-related event notifications. Two separate figures are used to describe the processing for these. The first process flow, shown in FIG. 7, represents the process flow for processing call-related event notifications in the SC-ASM. Recall that these event notifications inform the SC-ASM of the establishment and termination of a call leg between the call handler and the SAS (specifically, the SAM). The call-related event notifications are sent to the SC-ASM by the EHM when the SAS is bridged onto (and removed from) the call between the agent and remote party.

Relative to processing the speech-related event notifications, the processing of call-related event notifications is relatively straightforward and similar, as each ASM (including the SC-ASM) typically creates a separate "call instance data structure" (or simply "call instance") for each call (i.e., for each call leg bridged to the SAM). The call instance is a data structure defined for the ASM for maintaining data specific to a call for that application. When establishment of a call leg is reported, an ASM specific data structures may be generated. In one embodiment, the call instance comprises information allowing identification of the call (e.g., call leg) and includes identifiers associated with the various VoIP streams to allow identification of which party is associated with which VoIP stream. Other information, such as the time the data structure was created may be included. The call instance may then be modified or referenced when subsequent speech-related event notifications or other events are received for that call. Then, when the call leg is reported as terminated via a subsequent call-related event notification, the call instance (or selected portions thereof) may be saved, processed, and/or erased as appropriate. For example, detection of the bankruptcy context and an indication of how the agent responded to the bankruptcy context can be stored in the call instance data structure, which can then be saved in whole or in part when the call ends (e.g., the call leg is terminated).

Turning to the process flow 700 of FIG. 7, the process begins with receiving the event notification in operation 705. At this point, it is not known what type of event notification has been received. A test in operation 710 determines whether the event notification indicates a call establishment. Reference to a "call establishment" refers to creating a call leg from the call handler to the SAM, which occurs typically when a call is established between an agent and a remote party. Creating a call leg may reflect, for example, allocating a new identifier for a logical voice packet stream or establishing a virtual circuit of some form. There may be multiple voice channels or streams associated with a call leg (e.g., one for the agent and one for the remote party).

If the event notification received is a call-related event notification indicating call establishment, then the process proceeds to operation 715 where a call instance is created in the SC-ASM. This call instance is associated with the call (e.g., call leg) that was just established. The call instance can be associated with the call (e.g., call leg) by using a call reference identifier, call number, or some other similar form of call identifier. The creation of the call instance results in generating and initializing a data structure stored in the memory of the SC-ASM, and may further include storing the audio stream identifiers of the agent and remote party, so that the party identified in a speech-related event notification can be identified. The call instance data structure is defined by the SC-ASM and is typically unique relative to other call instance data structures generated by other ASMs.

If the event notification is not a call-related event notification indicating call establishment in operation 710, then the next test is to determine whether the event notification is a call-related event notification indicating termination of the call (e.g., call leg) in operation 725. If so, then the process continues to operation 720 where any appropriate data stored in the call instance is then saved (if desired) by writing the data to a file (e.g., an agent compliance file). Saving the call instance data retains the desired information of the audio context, events, actions, inaction, etc. for later review. For instance, in this application, information about an agent failing to respond properly in a context may be recorded for agent evaluation purposes. Each occurrence of an agent failure, including possibly information about a time, agent, call, context, etc. could be stored. This allows administrators to review potential problems or issues with the agent conforming to a particular policy. After the appropriate call instance data has been saved, the call instance data structure can be terminated in operation 735. The operation then returns to wait for the next event notification message in operation 705.

If the event notification is not a call-related event notification in operation 725, then the process flow continues from operation 725 to operation 730 that presumes the event notification is a speech-related event notification. Operation 730 reflects the processing of speech-related event notifications in the SC-ASM, which is detailed in FIG. 8.

The call-related event notification process flow shown in FIG. 7 is somewhat generic for the different types of ASMs that can be defined in a SAS. Namely, regardless of the ASM's purpose, call instances in an ASM are usually created in response to receiving a call-related event notification indicating call establishment. Then, any data generated during the call may be reflected in the call instance and saved when the call terminates. In many instances, there may not be any speech-related event notifications received during the call, so there may not be any changes to the call instance during the call. Thus, a call instance may be generated and erased (or saved), without any speech-related event notifications ever having been received. In the case of the SC-ASM, the call instance data could reflect the action or failure to respond properly by the agent after being informed of the policy for handling a bankruptcy context in a debt collection call. The amount of data retained reflects what aspects of the context are desired to be analyzed.

It is further evident that this aspect of the ASM process flow is continuously monitoring and processing event notifications for the duration of the call. After processing a particular event notification, the process loops back and is ready to process the next event notification. Even when a particular call is completed, and the corresponding call instance is terminated, the process is ready to receive and process another event notification, which may reflect a new call.

Figure 8:
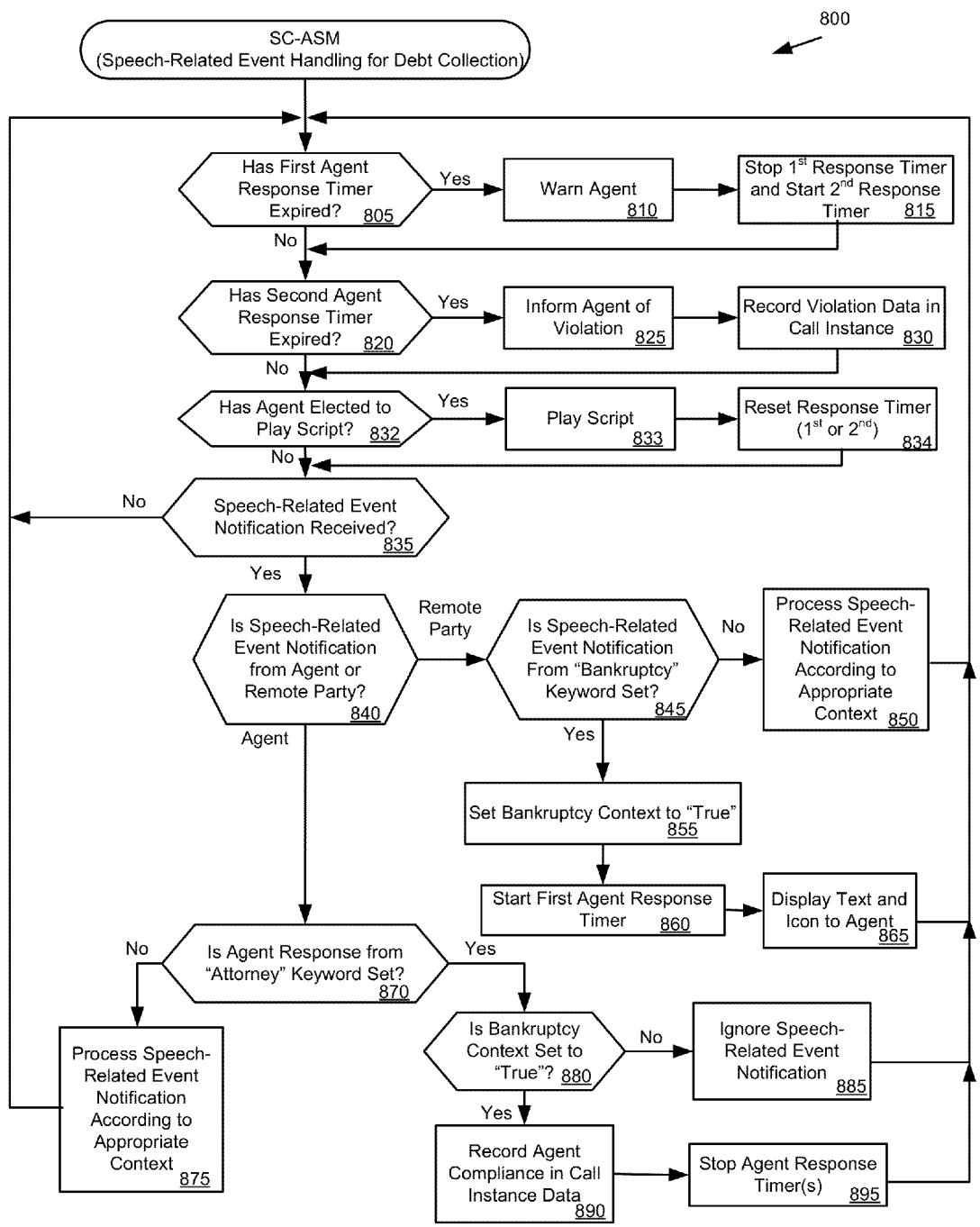

Speech-Related Event Notification Processing for Debt Collection Example (FIG. 8)

A process flow is shown in FIG. 8 for processing the speech-related event notifications based on the debt collection application previously described. Other process flows may be based on detecting other contexts and providing different agent prompts and script controls. Thus, the process flow in FIG. 8 is but one embodiment of applying the concepts and principles to allow an agent to respond to a particular context by invoking a script.

At a high level, the process involves detecting the bankruptcy context based on information from the remote party and informing or reminding the agent of the proper response to the bankruptcy context. Once the bankruptcy context is detected, a first response timer is started. The agent is expected to respond to the bankruptcy context in one of two ways within a certain time period defined by the first response timer. Specifically, the agent is expected to respond by either by playing a script which may inquire of the remote party's lawyer handling the bankruptcy or verbally inquire of the same. If the agent does not respond within the certain time period defined by the first response timer, a TBGI warning may be provided to the agent reminding the agent to respond, and a second response timer is started. If the agent does not properly respond (again by either causing the script to be played or inquiring of the party's lawyer handling the bankruptcy) within a second time period defined by the second response timer, then an agent violation is recorded. Otherwise, if the agent properly responds, the corresponding response timer is cancelled. Further, information about the agent properly responding may be recorded as well.

The process 800 begins in FIG. 8 with first determining whether the first response timer has expired in operation 805. Recall that this first response timer is set when the bankruptcy context is first detected, and cancelled if the agent responds properly. Thus, if this first response timer expires, the agent is then warned of the need to respond properly in operation 810. This can be accomplished by sending a TBGI to the agent's computer for display. Then, the first response timer is reset and stopped, and a second agent response timer is started in operation 815.

Once the first timer is reset and stopped, it is no longer considered as having expired. Depending on the embodiment, the second response timer may be the same, longer, or shorter duration than the first response timer.

If the first response timer has not expired in operation 805, then a test is made to see if the second response timer has expired in operation 820. Recall that this second response timer is started after the agent has been informed of the bankruptcy context and the agent has not properly responded after the expiry of the first time period. Thus, if the second response timer has expired in operation 820, the agent is then informed of their failure to respond properly in operation 825. Further, the second response timer is reset and stopped. Information regarding the agent's failure to response may be recorded in the call instance data structure in operation 830.

Next, a test is made to determine if the agent has elected to play the script (e.g., invoke the script control function) in operation 832. Playing a script may be defined as one form of an acceptable response from the agent. The agent may indicate this by selecting an icon displayed on their workstation screen. If this input from the agent is received, then the flow proceeds to operation 833 where the script is caused to be played to the remote party. Further, the timer, whether it be the first response timer or the second response timer, is reset and stopped in operation 834.

If the agent has not provided input to play the script, then a next test determines whether a speech-related event notification has been received in operation 835. If not, the process loops back to operation 805. The operations of 805, 820, 832 and 835 can be thought of as operations in a loop that continuously ascertains whether any response timers have expired, any input to play a script is received, or whether a speech-related event notification is received.

If a speech-related event notification is received in operation 835, then a test is made to see whether it reflects a keyword uttered from the agent or remote party in operation 840. Keywords from the remote party are examined to determine if the bankruptcy context is detected. Thus, a test is made in operation 845 to determine whether the speech-related event notification reports detection of a word from the bankruptcy context. If the speech-related event notification is not from the bankruptcy keyword set in operation 845, then this indicates that some other keyword was detected and the appropriate processing is to occur in operation 850. It is possible that other contexts are sent to the ASM and these are processed accordingly. In one embodiment, these other contexts can be ignored.

Assuming the agent uttered a keyword from the bankruptcy keyword set in operation 845, then a bankruptcy context flag is set to "true" in operation 855. This flag indicates that the bankruptcy context was detected. A first response timer is then started in operation 860 and the appropriate TBGI and script control icon are displayed to the agent in operation 865. The text of the TBGI could simply remind the agent that an inquiry should be made of the attorney handing the bankruptcy and the script control icon could reflect that the script that, when played, provides such an inquiry. The process then loops back to operation 805.

As noted earlier, once the first response timer is set, the agent is expected to respond within the time period, and the operations 805, 820, 832, and 835 will be continuously executed to monitor whether a response was provided. If the agent responds by invoking the script, then the process flow involving operations 833 and 834 will occur, and the response timer is reset.

If the agent has responded by verbally inquiring of the party's lawyer handling the bankruptcy, then the speech-related event notification will be received in operation 835, and it will be indicated as being from the agent in operation 840. If so, the process continues by testing whether the agent responded by uttering a keyword from the attorney keyword set. That is, the test in operation 870 determines if the keyword detected on the agent's speech reflects the attorney context. If not, then some other keyword must have been detected, and the process continues to operation 875 where the appropriate procedures are followed for that other context. It is possible that other contexts from the agent's speech may be detected and acted upon, or simply ignored by this ASM.

Assuming that the agent did use one of the words from the attorney keyword set in operation 870, the process then continues by testing whether the bankruptcy context flag is set to true in operation 880. This determines whether the agent used one of the attorney keywords before or after the remote party had used one of the bankruptcy keywords. If, for example, the agent is reported as using one of the attorney keywords prior to the remote party indicating bankruptcy, then the process may continue by ignoring the occurrence in operation 885. The agent may have merely used one of the attorney keywords for other reasons, and not in response to the remote party indicating bankruptcy. If however, the bankruptcy context is set to true in operation 880, then this indicates the agent is responding properly and information may be recorded in operation 890 indicating that the agent has complied with the debt collection policy as required. The process then stops the appropriate timer in operation 895, which may be the first response timer or the second response timer. This flow represents the agent properly responding to the bankruptcy context either within the first timer period or in the second timer period, after the agent has been warned. The process then continues to operation 805.

Because the ASM receives an indication with the speech-related event notification as to which party stated the keyword, this allows the process to readily distinguish between the agent and the remote party uttering a particular keyword. For example, if the agent had engaged in a conversation with the remote party and the word "lawyer" was mentioned, that would not in and of itself necessarily reflect the agent uttered this word in response to declaration of bankruptcy from the remote party. The remote party could have asked, e.g., whether the agent was a licensed lawyer, and the agent may have responded with "No, I am not." Thus, even though a keyword from the attorney keyword set was uttered, it was spoken by the remote party, not the agent. Further, even if the agent responded with "No, I am not a lawyer," this can be disregarded because it was not in uttered in response to a bankruptcy context.

The process flow shown in FIG. 8 could also be modified to accommodate possible false detections of a context. For example, assume the remote party had stated to the agent: "I intend to repay my debt and I will not avoid doing so by filing for bankruptcy." In this case, the remote party uttered a keyword, which may be "bankruptcy" or "filing for bankruptcy." However, the speech clearly indicates that the remote party has not filed for bankruptcy. Thus, the SAS may incorrectly detect the bankruptcy context. This error could be prevented by appropriately defining the keyword set. For example, when the word "not" precedes the phrase "filing for bankruptcy" then the context should not be reported. However, it may require time and experience to fine tune the logic in a keyword set for properly detecting a particular context. Thus, it may be expected that false context detections will occur and it will be necessary to incorporate procedures for the agent to handle a false context detection.

This could be accommodated by providing a "context error" icon on the agent's screen when the initial text and script control icon are presented (see, e.g., operation 865). This icon, when invoked, indicates that the agent believes the context was incorrectly ascertained by the system. For example, in the above exchange where the remote party indicates they are not planning to file for bankruptcy, the process flow may report this as bankruptcy context to the agent, and start a response timer. A TBGI may be presented to the agent indicating the bankruptcy context was detected, along with a context error icon. The agent may respond to this display by invoking the "context error" function, which cancels the response timer. This can be recorded by the ASM so that the SAS system can be fined tuned in the future to avoid incorrectly identifying a context.

Otherwise, without such a mechanism, the agent will know that he will be expected to inquire about the party's attorney, which would be inappropriate. Further, the agent may know that if the agent does not do so, then a failure of the agent to respond properly may be incorrectly reported. Thus, an incorrect determination of an agent failure would be recorded. Or, this could cause the agent to somehow incorporate the expected keywords in his speech in order to meet the system expectations, even though doing so would be inappropriate to the context of the call, and may further confuse the called party.

Other Embodiments

The process flow of FIG. 8 illustrates one embodiment, and a number of variations in the ASM logic are readily possible.

For example, the above example detects a context and in response, provides the agent with a script control icon and starts a timer to determine if the agent responds within a certain time period. In other embodiments, after detecting a particular context, one or more script control icons could be displayed without starting a timer. Further, these icons may be displayed for a limited time period.

For example, assume that a customer has bought a computing system that includes a computer and printer. The customer then asks the agent details of the warranty. The SAS could detect the context pertaining to product warranty, and display multiple script control icons that contain scripts with one pertaining to the computer warranty and another one pertaining to the printer warranty. The agent could then select which one was appropriate (or neither). Further, these icons may be displayed for a short time (e.g., 20 seconds), since it may be likely that they will only be appropriate for a limited time period. Then, as the call proceeds, the SAS could detect another question or topic from the customer that is a defined context, and display the corresponding icons for these contexts, and so forth.

Thus, as contexts are received, TBGI and script icons may appear and then disappear on the agent's screen. The temporary display can provide an ongoing temporary form of assistance to the agent, and avoids the agent from having to cancel or close out an ever growing list of script control icons on their display, which would distract the agent from their call. Thus, each icon presented could have a defined "lifetime" for displaying itself to the agent.

In another embodiment, the script icons can be integrated with, or displayed separately from, any associated TBGI. Alternatively, different text may be presented with the script icons at different times. For instance, in the debt collection example, the agent is first informed of the context via a first display of TBGI, and then provided a second visual warning using a second TBGI. The second visual warning could further include the same script icon control and the text may have a larger font, brighter colors, flashing text, etc. to garner the attention of the agent. Thus, the script control icon may be presented initially with a first TBGI and then later on again with a second but different TBGI.

Exemplary Computer Processing Device

Figure 9:
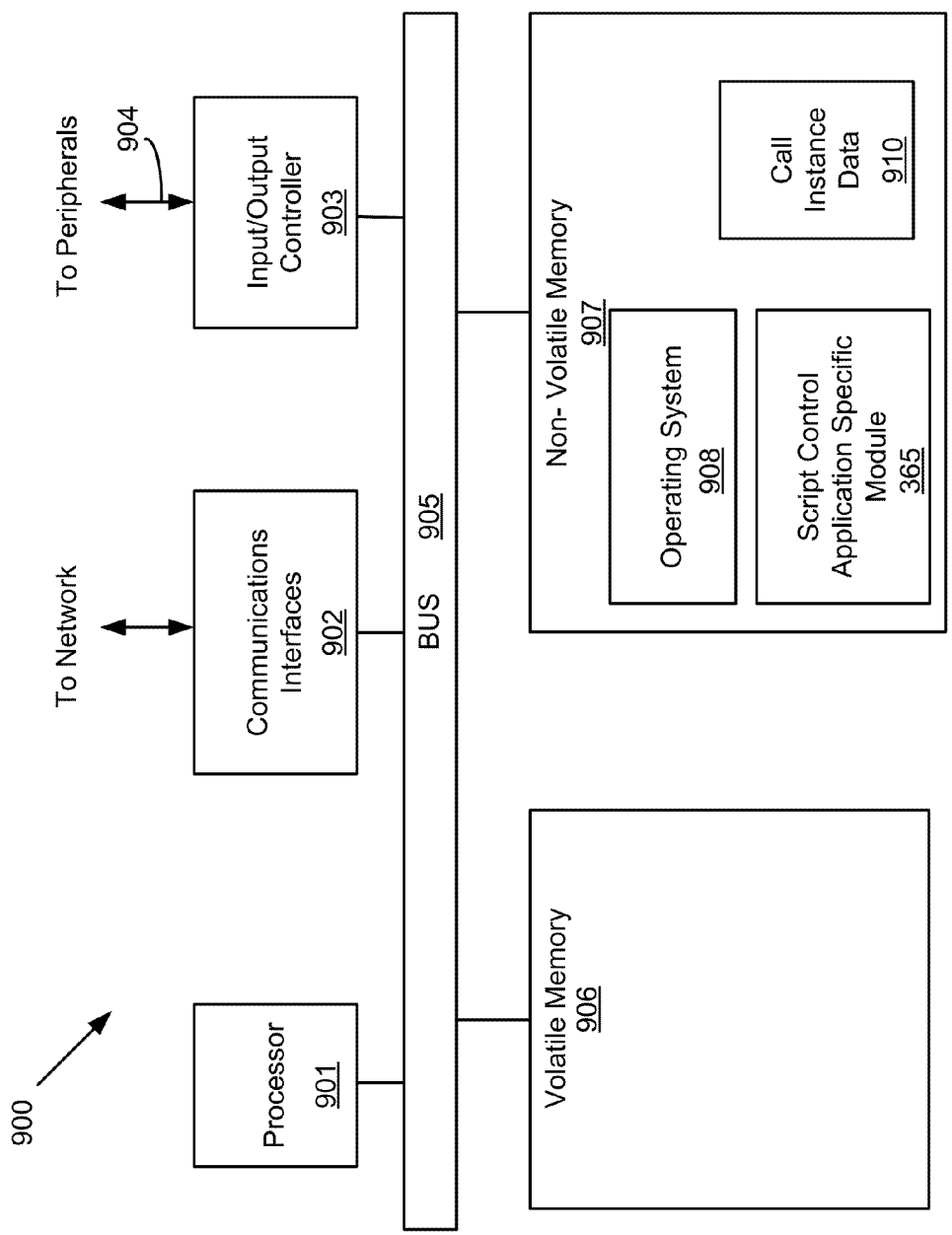
FIG. 9 illustrates an embodiment of a processing device for practicing the various technologies and concepts disclosed herein.

FIG. 9 is an exemplary schematic diagram of a computer processing system that may be used in embodiments to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

The system 900 may apply to the system executing any of the above modules, including the call handler 100, the SAM 320, the EHM 350, and/or the SC-ASM 365, although only the SC-ASM is shown in FIG. 9. FIG. 9 could also represent the system of the agent's computer, which displays the status indications to the agent. Further, although FIG. 9 shows only the SC-ASM, other modules may be present in the system of FIG. 9, either by integrating their functions into a single module or as separate modules in the system.

As shown in FIG. 9, the processing system 900 may include one or more processors 901 that may communicate with other elements within the processing system 900 via a bus 905. The processor 901 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 900 may also include one or more communications interfaces 902 for communicating data via a data network, such as a local network, with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 903 may also communicate with one or more input devices or peripherals using an interface 904 such as, but not limited to: a keyboard, a mouse, a touch screen/display input, microphone, pointing device, etc. The input/output controller 903 may also communicate with output devices or peripherals, such as displays, printers, speakers, headsets, banner displays, etc. These may be used, in part, to receive administrator input, such as for configuring the system's operation.

The processor 901 may be configured to execute instructions stored in volatile memory 906, non-volatile memory 907, or other forms of computer readable storage media accessible to the processor 901. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 907 may store various program code modules and data, which also may be loaded into the volatile memory 906 at execution time (though not shown as such in FIG. 9). For example, the non-volatile memory 907 may store one or more modules, such as the SC-ASM 365 that may implement and perform the above-mentioned process flows containing instructions for performing the process and/or functions associated with the technologies disclosed herein, as well as operating system code 908. The SC-ASM 365 may also manage data such as the call instance data 910 which may be recorded in long term or secondary storage for various calls. The data and/or modules in the non-volatile memory may be copied in the volatile memory 906 at run time. The volatile memory 906 and/or non-volatile memory 907 may be used to store other information including, but not limited to: records, applications, programs, scripts, source code, object code, byte code, compiled code, interpreted code, machine code, executable instructions, or the like. These may be executed or processed by, for example, the processor 901 and may form a part of, or may interact with, the SC-ASM 365.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). The computer readable storage media includes all the above tangible identified computer readable media (including volatile and non-volatile media), but does not encompass a transitory, propagating signal, photon-based storage media, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

The examples for illustrating the concepts and the technologies herein have focused on agents in a contact center, but could be easily applied to other types of applications. Further, those skilled in the art will recognize that in light of this disclosure, many alternative embodiments and applications could be designed taking into account the concepts and technologies disclosed herein.

The invention claimed is:

1. A system for providing contextual assistance to an agent in a contact center on a call to a remote party, the system comprising:
   a computer processor configured to:
      receive a first speech-related event notification indicating detection of a first keyword in speech from the remote party on the call;
      cause text-based guidance information ("TBGI") to be presented on a computer used by the agent in response to receiving the first speech-related event notification, wherein the TBGI indicates detection of the first keyword;
      cause a response timer to be started in response to causing the TBGI to be presented on the computer; and
      stop the response timer in response to receiving a second speech-related event notification indicating detection of a second keyword in speech from the agent on the call.

2. The system of claim 1, wherein the call is a debt collection call, the first keyword is from a group consisting of "bankrupt" and "bankruptcy," and the second keyword is from a group consisting of "attorney", "lawyer", "law firm", "court", and "case number."

3. The system of claim 1, wherein the TBGI presented on the computer further comprises a script control icon, and the computer processor is further configured to:
   receive an input from the computer reflecting the agent selecting the script control icon; and
   cause a pre-recorded script to be provided to the remote party in response to receiving the input.

4. The system of claim 3, wherein the computer processor is further configured to:
   stop the response timer in response to causing the pre-recorded script to be provided to the remote party.

5. The system of claim 3, further comprising:
   an announcement component configured to:
      receive a message from the computer processor requesting the pre-recorded script to be provided to the remote party; and
      in response to receiving the message from the computer processor, cause the pre-recorded script to be provided to the remote party.

6. The system of claim 3, wherein the TBGI presented on the computer further comprises a text script configured to be read by the agent.

7. The system of claim 6, wherein the text script includes at least one word from a group of words consisting of "attorney", "lawyer", "law firm", "court", or "case number."

* * * * *